US009988095B2

(12) United States Patent
Maier (10) Patent No.: US 9,988,095 B2
(45) Date of Patent: Jun. 5, 2018

(54) VEHICLE A-PILLAR RIB CONFIGURATION (71) Applicant: Thunder Power New Energy Vehicle Development Company Limited, Central (HK)

(72) Inventor: Jens Maier, Milan (IT)

(73) Assignee: Thunder Power New Energy Vehicle Development Company Limited, Central (HK)

(*) Notice: Subject to any disclaimer, the term of this patent is extended or adjusted under 35 U.S.C. 154(b) by 0 days. days.

(21) Appl. No.: 15/691,058

(22) Filed: Aug. 30, 2017

(65) Prior Publication Data

US 2018/0065682 A1 Mar. 8, 2018

Related U.S. Application Data (60) Provisional application No. 62/384,298, filed on Sep. 7, 2016.

(51) Int. Cl.
*B62D 25/04* (2006.01)
*B62D 29/00* (2006.01)
*B62D 21/15* (2006.01)
*B62D 29/04* (2006.01)

(52) U.S. Cl.
CPC ........... *B62D 25/04* (2013.01); *B62D 21/157* (2013.01); *B62D 29/008* (2013.01); *B62D 29/04* (2013.01)

(58) Field of Classification Search
CPC ........ B62D 23/00; B62D 25/02; B62D 25/04; B62D 29/008
USPC .................. 296/193.05, 193.06, 202, 203.03
See application file for complete search history.

(56) References Cited

U.S. PATENT DOCUMENTS

| 9,718,500 | B2* | 8/2017 | Lee ........................ B62D 25/04 |
| 2015/0001884 | A1* | 1/2015 | Saje ....................... B62D 25/04 |
| | | | 296/193.06 |
| 2015/0145286 | A1* | 5/2015 | Saje ....................... B22D 17/00 |
| | | | 296/193.06 |
| 2015/0151796 | A1* | 6/2015 | Berger .................... B29C 70/68 |
| | | | 296/193.06 |

\* cited by examiner

*Primary Examiner* — Jason S Daniels
(74) *Attorney, Agent, or Firm* — Kilpatrick Townsend & Stockton LLP (57) ABSTRACT

An A-pillar structure in an electric vehicle for increasing vehicle rigidity and decreasing potential damage to the vehicle battery and to passengers. The A-pillar structure may include a surface and various ribs and bosses that protrude outward from the surface. The A-pillar structure may include three main cross ribs that being along a front edge of the A-pillar structure and extend rearward in the longitudinal direction toward two bosses. The bosses may be coupled via additional ribs to an anchor structure that is secured to the body structure and/or chassis of the electric vehicle. The rib configuration influences the transfer of energy through the A-pillar structure in the event of a collision.

16 Claims, 8 Drawing Sheets

VEHICLE A-PILLAR RIB CONFIGURATION

CROSS-REFERENCE TO RELATED APPLICATION

This Application claims priority to U.S. Provisional Application No. 62/384,298, entitled ELECTRIC VEHICLE COMPONENTS, filed on Sep. 7, 2016, which is hereby incorporated by reference in its entirety for all purposes.

BACKGROUND OF THE INVENTION

Vehicle manufacturers have added a number of new structural features to vehicles to improve safety and/or performance. Many of these structural features are applicable to electric, hybrid, and non-electric vehicles equally, while others place a greater emphasis on the vehicle motor type, such as a vehicle base plate with increased thickness for protecting an electric car battery over a specific region of the vehicle. Structural improvements that increase either safety or performance without a significant compromise of the other remain important objectives of vehicle manufacturers.

Electric vehicles are becoming an increasingly viable alternative to traditional vehicles with internal combustion engines. Electric vehicles may have advantages in their compactness, simplicity of design, and in being potentially more environmentally friendly depending on the means by which the electricity used in the vehicle was originally generated. The prospect of using renewable energy sources to power automobiles in place of gasoline has obvious advantages as oil reserves across the globe become increasingly depleted.

BRIEF SUMMARY OF THE INVENTION

In a first embodiment of the present disclosure, a vehicle is provided. The vehicle may include an A-pillar structure having a plurality of ribs protruding outward from a surface. The A-pillar structure may include an upper boss and a lower boss protruding outward from the surface in the lateral direction. The upper boss may be positioned vertically above the lower boss. The A-pillar structure may include an upper cross rib protruding outward from the surface and extending between a front edge of the A-pillar structure and the upper boss. The A-pillar structure may include a middle cross rib protruding outward from the surface and extending between the front side and the upper boss. The A-pillar structure may include a lower cross rib protruding outward from the surface and extending between the front side and the lower boss. The A-pillar structure may include a boss column protruding outward from the surface and extending between the upper boss and the lower boss in the vertical direction.

In some embodiments, the upper cross rib may not be directly coupled to the middle cross rib. In some embodiments, the middle cross rib may not be directly coupled to the lower cross rib. In some embodiments, the lower cross rib may not be directly coupled to the upper cross rib. In some embodiments, the upper cross rib may include two substantially planar non-parallel sections that form a first angle with respect to each other. In some embodiments, the middle cross rib may be substantially planar. In some embodiments, the lower cross rib may include two substantially planar non-parallel sections that form a second angle with respect to each other. In some embodiments, the A-pillar structure may include a top rib protruding outward from the surface and extending between a top edge of the A-pillar and the first angle. In some embodiments, the first angle and the second angle may be obtuse angles. In some embodiments, the second angle may be greater than the first angle.

In some embodiments, the A-pillar structure may include a center rib protruding outward from the surface in the lateral direction and extending between the first angle and the second angle in the vertical direction. In some embodiments, the center rib may directly couple to each of the upper cross rib, the middle cross rib, and the lower cross rib. In some embodiments, the A-pillar structure may include an anchor structure protruding outward from the surface in the lateral direction. In some embodiments, the boss column may extend between the lower boss and the anchor structure in the vertical direction. In some embodiments, the anchor structure may be coupled to a body structure of the vehicle. In some embodiments, the A-pillar structure may be an aluminum casting. In some embodiments, the upper boss and the lower boss have a maximum depth in the lateral direction that is greater than or equal to a depth of the plurality of ribs.

In a second embodiment of the present disclosure, an A-pillar structure is provided as described above.

In a third embodiment of the present disclosure, a method for receiving an impact force related to a vehicle collision is provided. The method may include receiving, by the upper cross rib, a first force related to the impact force. The method may include receiving, by the middle cross rib, a second force related to the impact force. The method may include receiving, by the lower cross rib, a third force related to the impact force. The method may include transferring a first portion of the first force received by the upper cross rib to the upper boss. The method may include transferring a second portion of the second force received by the middle cross rib to the upper boss. The method may include transferring a third portion of the third force received by the lower cross rib to the lower boss. In some embodiments, the method may include transferring a fourth portion of the force received by the upper boss to the lower boss via the boss column.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention. No attempt is made to show structural details of the invention in more detail than may be necessary for a fundamental understanding of the invention and various ways in which it may be practiced.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION OF THE INVENTION

Embodiments of the present disclosure relate to an A-pillar structure situated in an electric vehicle for reducing the effects of a vehicle collision. The A-pillar of a vehicle generally refers to a vertical support structure in front of the driver door or in front of the front passenger door. Safety benefits of the disclosed A-pillar structure include, but are not limited to: (1) increased rigidity of the vehicle, (2) increased absorption of energy, and (3) increased efficiency of transfer of energy/force stemming from a front or angled impact to the vehicle's body structure from the longitudinal direction to the vertical direction, lessening the potential impact applied to the vehicle battery and to passengers in the vehicle. For electric vehicles, an increased emphasis is placed on protection of the electric battery as damage to battery cells can cause explosion and fires within the vehicle. The problem is compounded due to the large amount of space batteries must occupy within electric vehicles in order to maintain practical driving ranges. Therefore, vehicle alterations that provide increased protection along edges and corners of the vehicle battery are advantageous.

In some embodiments, the A-pillar structure includes a surface and various ribs and bosses protruding outward from the surface in the lateral direction. Specifically, the A-pillar structure may include three main cross ribs that begin along a front edge of the A-pillar structure and extend rearward in the longitudinal direction across the A-pillar structure. These main cross ribs are referred to herein as the upper cross rib, the middle cross rib, and the lower cross rib. One of the purposes of these main cross ribs is to transfer energy from a longitudinal direction (due to a head-on collision) to a downward direction, where the energy may be more safely handled. Another purpose of these main cross ribs is to channel energy toward two bosses, referred to herein as the upper boss and the lower boss, which then channel energy toward an anchor structure. The two bosses and the anchor structure have good energy absorption qualities and may be secured to the body structure and/or chassis of the vehicle, which is a more desirable energy target than the vehicle battery and the vehicle passengers.

In addition to the three main cross ribs, additional ribs may be added to yield a more complex rib configuration. The addition of each rib to the rib configuration as described herein improves the performance of the A-pillar structure. The specific rib configurations described herein were achieved as a result of thorough analysis and simulation, and therefore certain deviations from the designs may reduce the performance of the A-pillar structure from that achieved using the specific rib configurations described herein. For example, as will be discussed, the performance of the A-pillar structure may be improved with the addition of one or more of: a center rib, a top rib, a first support rib, a second support rib, a third support rib, a fourth support rib, a fifth support rib, a front base rib, and a rear base rib.

The A-pillar structure described herein may be an aluminum casting part that is manufactured as a single integrated piece. In other embodiments, the A-pillar structure comprises multiple different manufactured components that are later fastened together. Furthermore, the A-pillar structure need not be aluminum but may be manufactured from a wide range of materials that are either currently available (such as carbon fiber or steel) or will be developed in the future.

Figure 1:
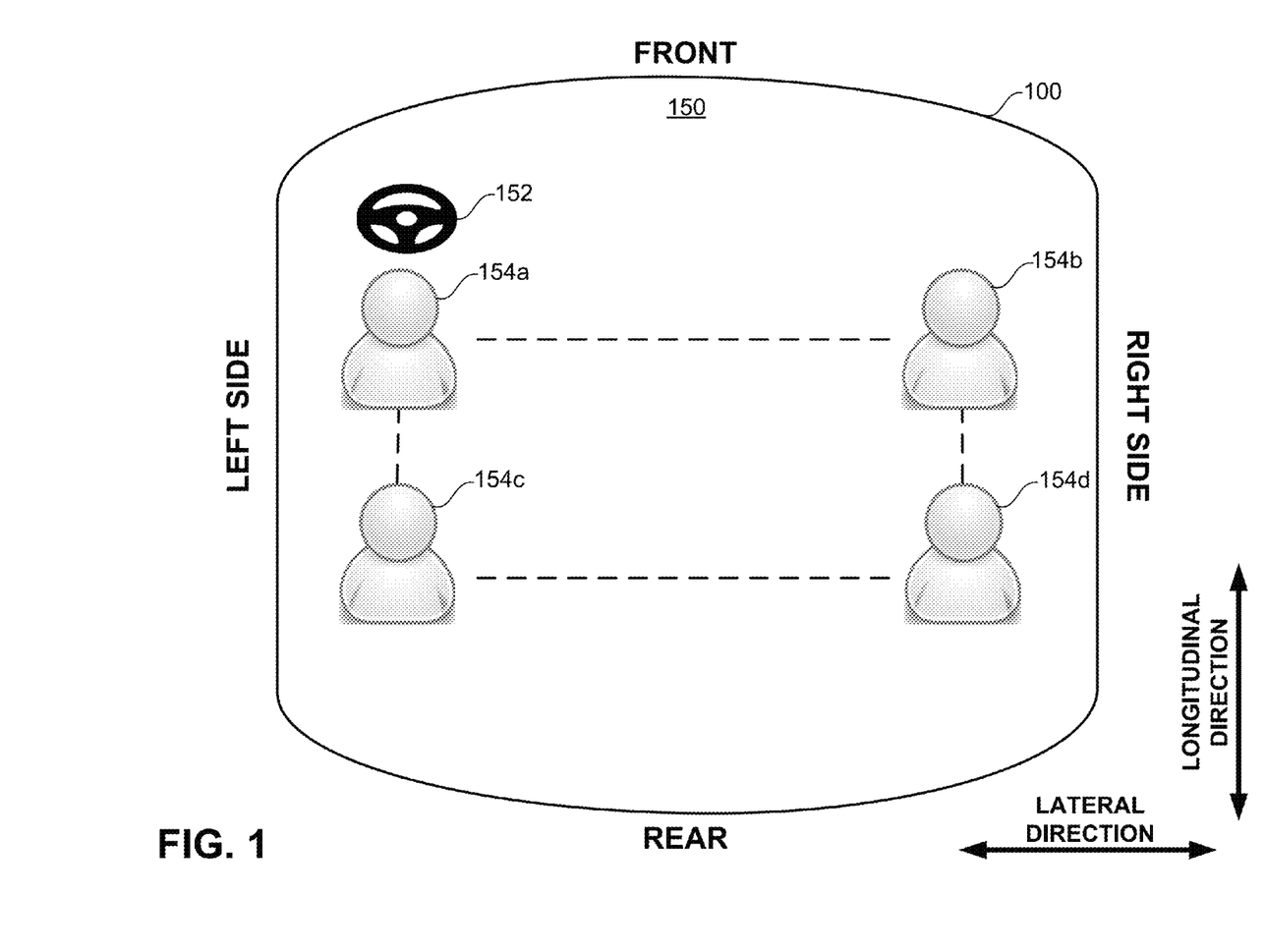
FIG. 1 illustrates a generalized transportation apparatus, according to an embodiment of the present disclosure.

FIG. 1 illustrates a generalized transportation apparatus 100, according to an embodiment of the present disclosure. Transportation apparatus 100 may include any apparatus that moves in distance. Examples of transportation apparatus 100 may include a vehicle such as a car, a bus, a train, a truck, a tram, or any other type of vehicle; may include a vessel such as a boat, a ship, a barge, a ferry or any other type of watercraft; may include an aircraft such as an airplane, a helicopter, a spaceship, or any other type of aircraft; or may include any other transportation apparatus. In some embodiments, transportation apparatus 100 is an electrical automobile. As shown, transportation apparatus 100 may include a cabin 150 with a volume.

As shown in FIG. 1, transportation apparatus 100 may comprise one or more steering wheels 152 in cabin 150. Although only one steering wheel 152 is shown in FIG. 1, this is not intended to be limiting. In some examples, transportation apparatus 100 may include more than one steering wheel 152. For example, it is contemplated that transportation apparatus 100 may be an aircraft that comprises at least a main steering wheel 152 for the main pilot and at least a secondary steering wheel 152 for the co-pilot.

As also shown in FIG. 1, one or more users 154 may be arranged to occupy their corresponding positions in cabin 150. Users 154 may include one or more drivers that control the movement or navigation of transportation apparatus 100, one or more passengers, and/or any other type of users 154. In this example, user 154a is a driver that controls the driving of transportation apparatus 100, while other users 154, e.g., users 154b-d, are passengers. As still shown, there may be multiple rows of users 154 within cabin 150 of transportation apparatus 100.

Figure 2:
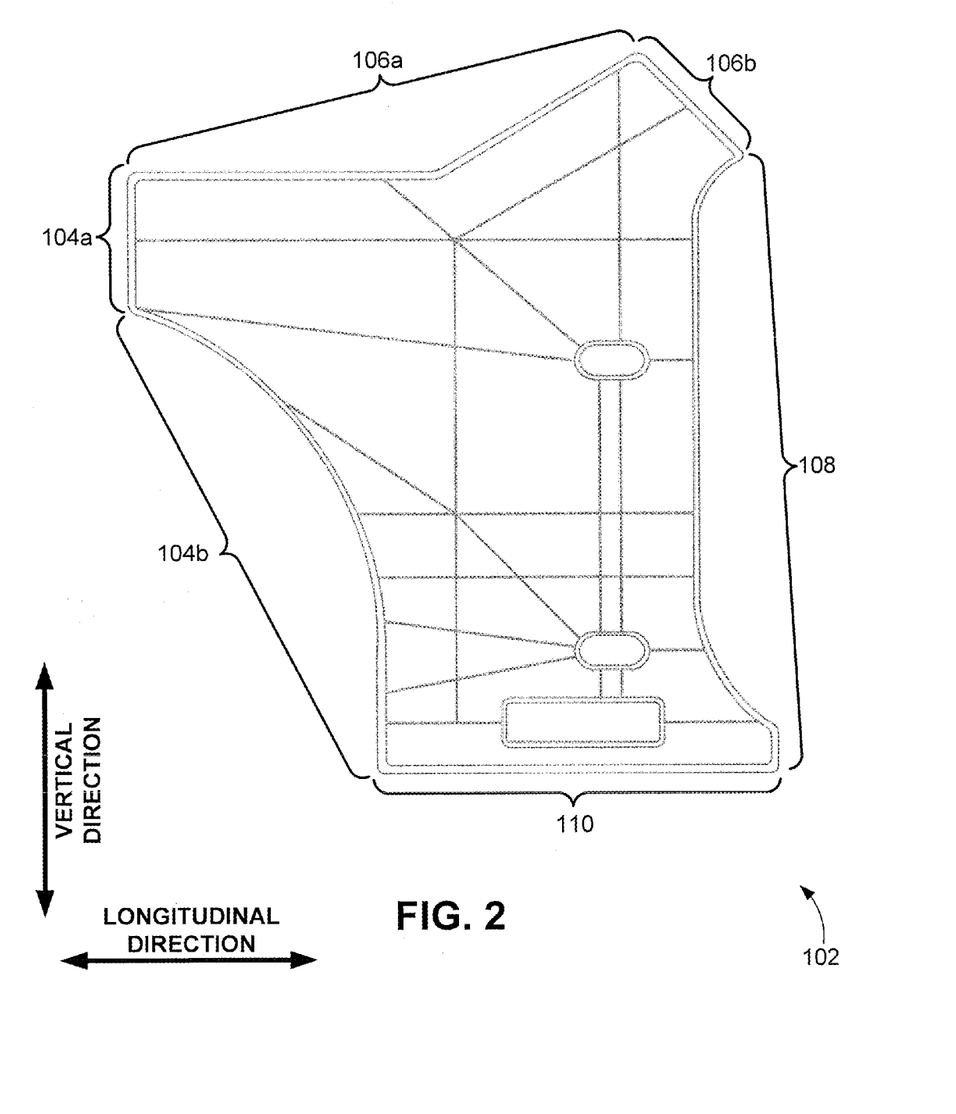
FIG. 2 illustrates a side view of an A-pillar structure, according to an embodiment of the present disclosure.

FIG. 2 illustrates a side view of an A-pillar structure 102, according to an embodiment of the present disclosure. For convenience in describing the A-pillar structure 102, various edges of the A-pillar structure 102 may be defined. The A-pillar structure 102 may include a front edge 104 that includes one or more edges of the A-pillar structure 102 positioned toward the front of the electric vehicle 100 in the longitudinal direction. The front edge 104 may include one or more edges adjacent to the front wheel well (front edge 104b) as well as one or more edges above the front wheel well (front edge 104a). The A-pillar structure 102 may also include a top edge 106 that includes one or more edges of the A-pillar structure 102 positioned toward the top of the electric vehicle 100 in the vertical direction, as well as a rear edge 108 and a bottom edge 110 that include one or more edges positioned toward the rear and the bottom of the electric vehicle 100, respectively.

Figure 3:
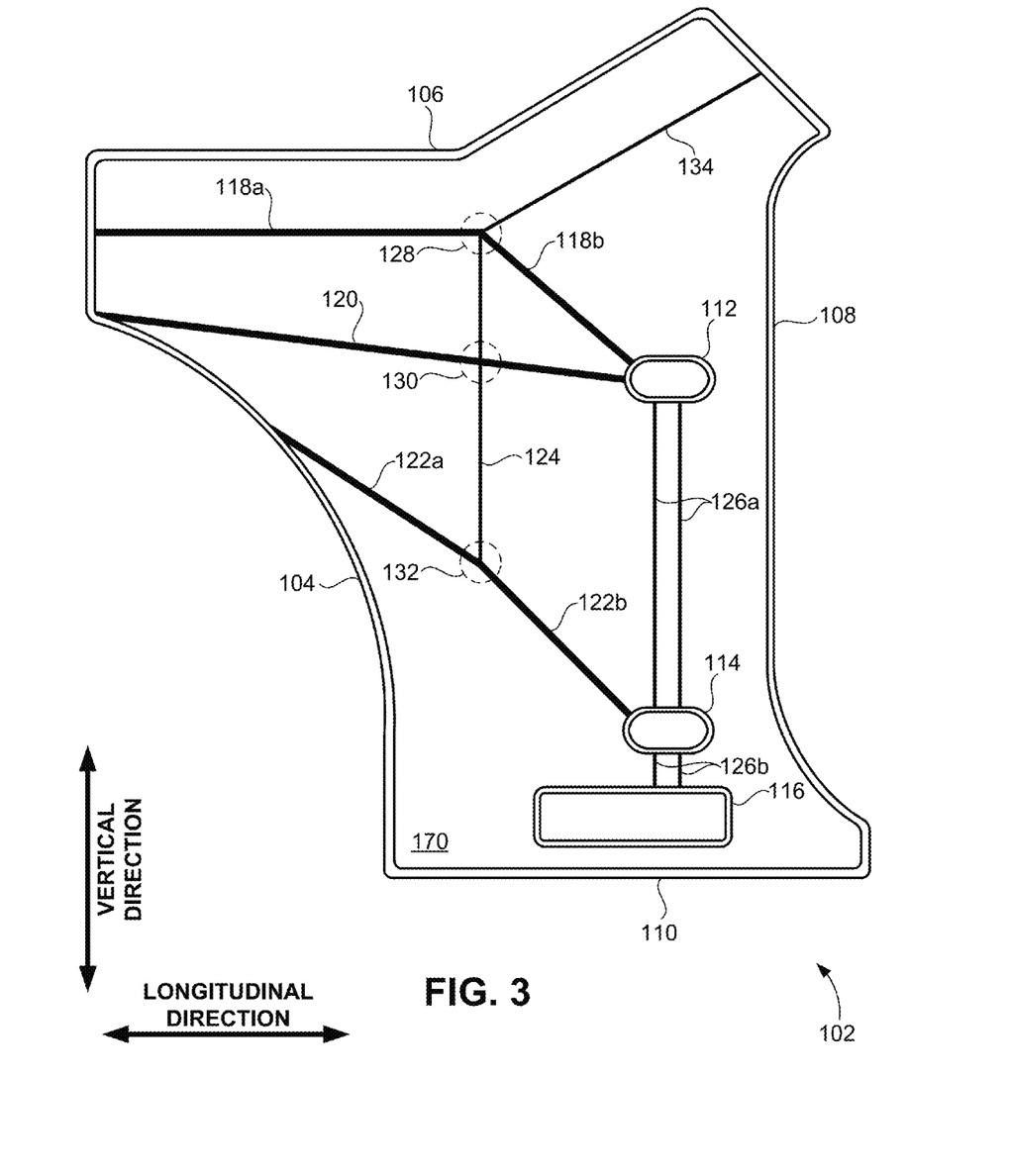
FIG. 3 illustrates a side view of an A-pillar structure, according to an embodiment of the present disclosure.

FIG. 3 illustrates a side view of the A-pillar structure 102, according to an embodiment of the present disclosure. In some embodiments, the A-pillar structure 102 includes an upper cross rib 118, a middle cross rib 120, and a lower cross rib 122, as well as an upper boss 112 and a lower boss 114. Although both ribs and bosses protrude outward from a surface 170, they differ by their depth, thickness, and length. Specifically, in some embodiments bosses contain more material and have a greater depth in the lateral direction than ribs. Furthermore, bosses are more centralized than ribs, which extend over a greater length in the vertical and/or longitudinal direction. In some embodiments, the upper cross rib 118, the middle cross rib 120, and the lower cross rib 122 have a greater thickness than other ribs in the rib configuration, as illustrated in FIG. 3 by the thicker black lines.

In some embodiments, the upper cross rib 118 extends between the front edge 104 and the upper boss 112. The upper cross rib 118 is directly coupled to the front edge 104, the surface 170, and the upper boss 112. The upper cross rib 118 includes two substantially planar non-parallel sections that form an angle at upper node 128 (labeled as 118a and 118b). The formed angle is greater than 90 degrees to ensure adequate transfer of energy along the upper cross rib 118.

In some embodiments, the middle cross rib 120 extends between the front edge 104 and the upper boss 112. The middle cross rib 120 is not directly coupled to the upper cross rib 118 but is directly coupled to the front edge 104, the surface 170, and the upper boss 112. The middle cross rib 128 is substantially planar to ensure adequate transfer of energy along the middle cross rib 128.

In some embodiments, the lower cross rib 122 extends between the front edge 104 and the lower boss 114. The lower cross rib 122 is not directly coupled to either the upper cross rib 118 or the middle cross rib 120, but is directly coupled to the front edge 104, the surface 170, and the lower boss 114. The lower cross rib 122 includes two substantially planar non-parallel sections that form an angle at lower node 132 (labeled as 122a and 122b). The formed angle is greater than 90 degrees to ensure adequate transfer of energy along the lower cross rib 122. In some embodiments, the lower cross rib 122 is substantially planar, however improved performance of the A-pillar structure 102 is achieved where the lower cross rib 122 has a slight angle at lower node 132. Additionally, improved performance of the A-pillar structure 102 is achieved where the lower cross rib 122 has a greater angle than the upper cross rib 118.

In some embodiments, the upper boss 112 and the lower boss 114 are interconnected via a boss column 126 that extends between the two bosses. The boss column 126 may include two separate ribs or a single rib. Use of two separate ribs may be advantageous as it reduces the torque applied to the lower boss 114 by the upper boss 112 by linearizing the transfer of energy between them. The boss column 126 is ideally strong enough to transfer at least as much energy as the upper cross rib 118 and the middle cross rib 120 combined. In some embodiments, the boss column 126 extends downward in the vertical direction such that the upper boss 112 and the lower boss 114 are vertically aligned.

In some embodiments, the boss column 126 extends downward in the vertical direction past the lower boss 114 to an anchor structure 116. The anchor structure 116 is similar to the upper boss 112 and the lower boss 114 but is ideally larger than both bosses. The anchor structure 116 may be coupled to the body structure and/or chassis of the electric vehicle 100 such that energy received by the anchor structure 116 is transferred to one or both. In some embodiments, the anchor structure 116 is not coupled to the body structure and/or chassis of the electric vehicle 100 such that energy received by the anchor structure 116 is not transferred.

In some embodiments, the A-pillar structure 102 includes a center rib 124 that extends between upper node 128 and lower node 132 such that it passes through the middle cross rib 120 at middle node 130. In some embodiments, the center rib 124 extends downward in the vertical direction such that it is parallel to the boss column 126. In some embodiments, the A-pillar structure 102 includes a top rib 134 that extends between the top edge 106 and upper node 128. The top rib 134 is coupled to the top edge 106 along a portion of the vehicle's A-pillar that continues to the roof (labeled as 106b in FIG. 2) The center rib 124 and the top rib 134 provide vertical structural support for the rib configuration and prevent the upper cross rib 118 and the lower cross rib 122 from bending at upper node 128 and lower node 132, respectively.

In some embodiments, performance of the A-pillar structure 102 is improved by reinforcing upper node 128, middle node 130, and lower node 132 with additional material. For example, these nodes may comprise cylindrical structures that protrude outward from the surface 170 and encompass portions of the various ribs that enter the nodes. In some embodiments, it may be advantageous to reinforce upper node 128 to ensure rigidity of the A-pillar structure 102 in that region. The reinforced portions may extend radially outward in the lateral direction and the longitudinal direction from the nodes as indicated by the circles illustrated in FIG. 3.

Figure 4:
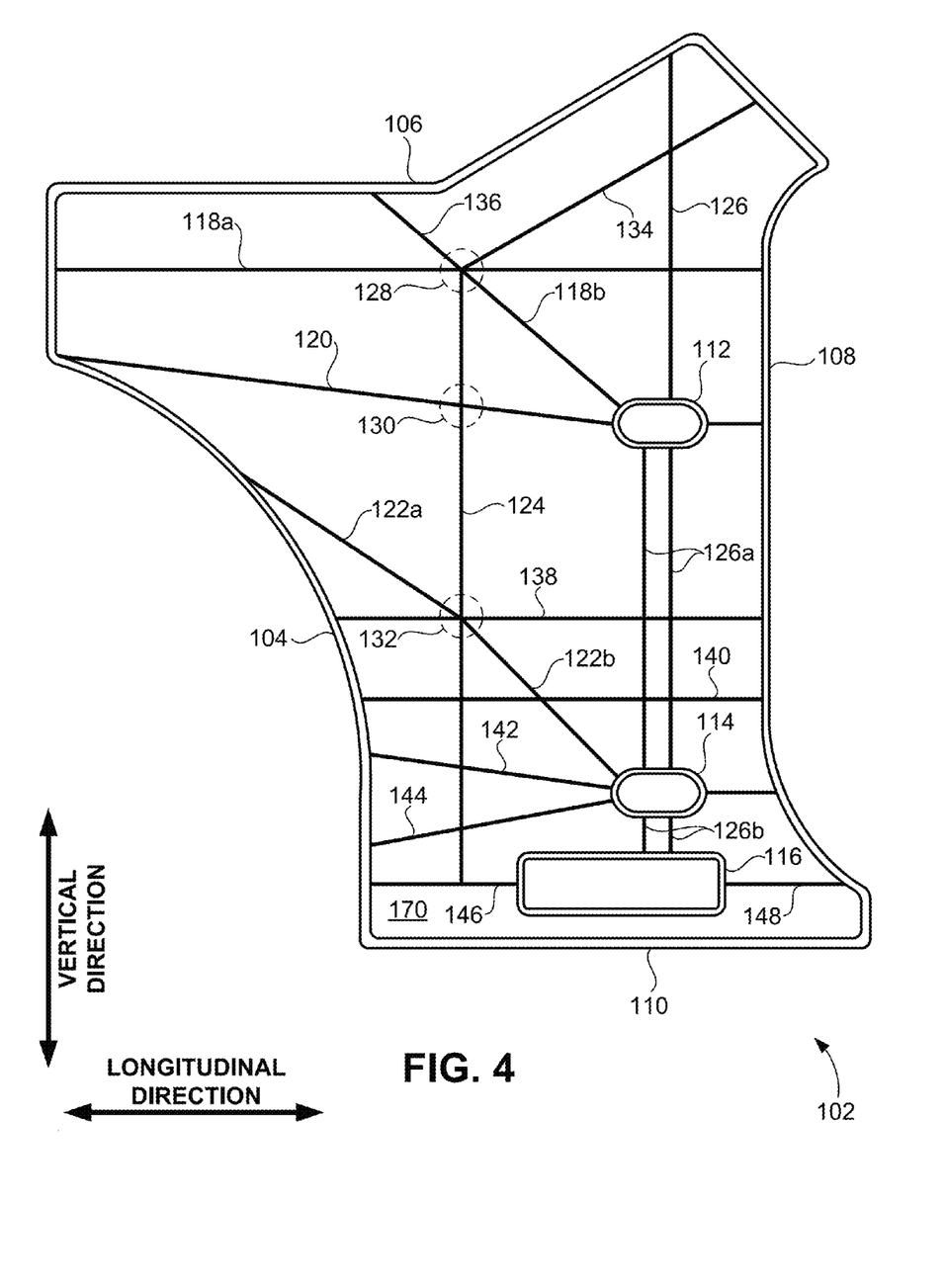
FIG. 4 illustrates a side view of an A-pillar structure, according to an embodiment of the present disclosure.

FIG. 4 illustrates a side view of the A-pillar structure 102, according to an embodiment of the present disclosure. In some embodiments, the A-pillar structure 102 may include additional ribs to yield a more complex rib configuration which may improve the performance of the A-pillar structure 102. For example, the A-pillar structure 102 may include: a first support rib 136 that extends between the top edge 106 and upper node 128, a second support rib 138 that extends between the front edge 104 and the rear edge 108 passing through lower node 132 and the boss column 126, a third support rib 140 that extends between the front edge 104 and the rear edge 108 passing through the center rib 124, the lower cross rib 122, and the boss column 126, a fourth support rib 142 that extends between the front edge 104 and the lower boss 114 passing through the center rib 124, and a fifth support rib 144 that extends between the front edge 104 and the lower boss 114 passing through the center rib 124. In some embodiments, the first support rib 136 is co-planar with a section of the upper cross rib 118b.

In some embodiments, the A-pillar structure 102 includes a front base rib 146 and a rear base rib 148 to support the anchor structure 116 in the longitudinal direction. The front base rib 146 extends between the front edge 104 and the anchor structure 116, and may couple to the center rib 124 at an end point of the center rib 124. By coupling with an end point of the center rib 124, the front base rib 146 further channels vertical energy through the anchor structure 116. The front base rib 146 and the rear base rib 148 are co-planar to prevent torque from being applied to the anchor structure 116.

Figure 5:
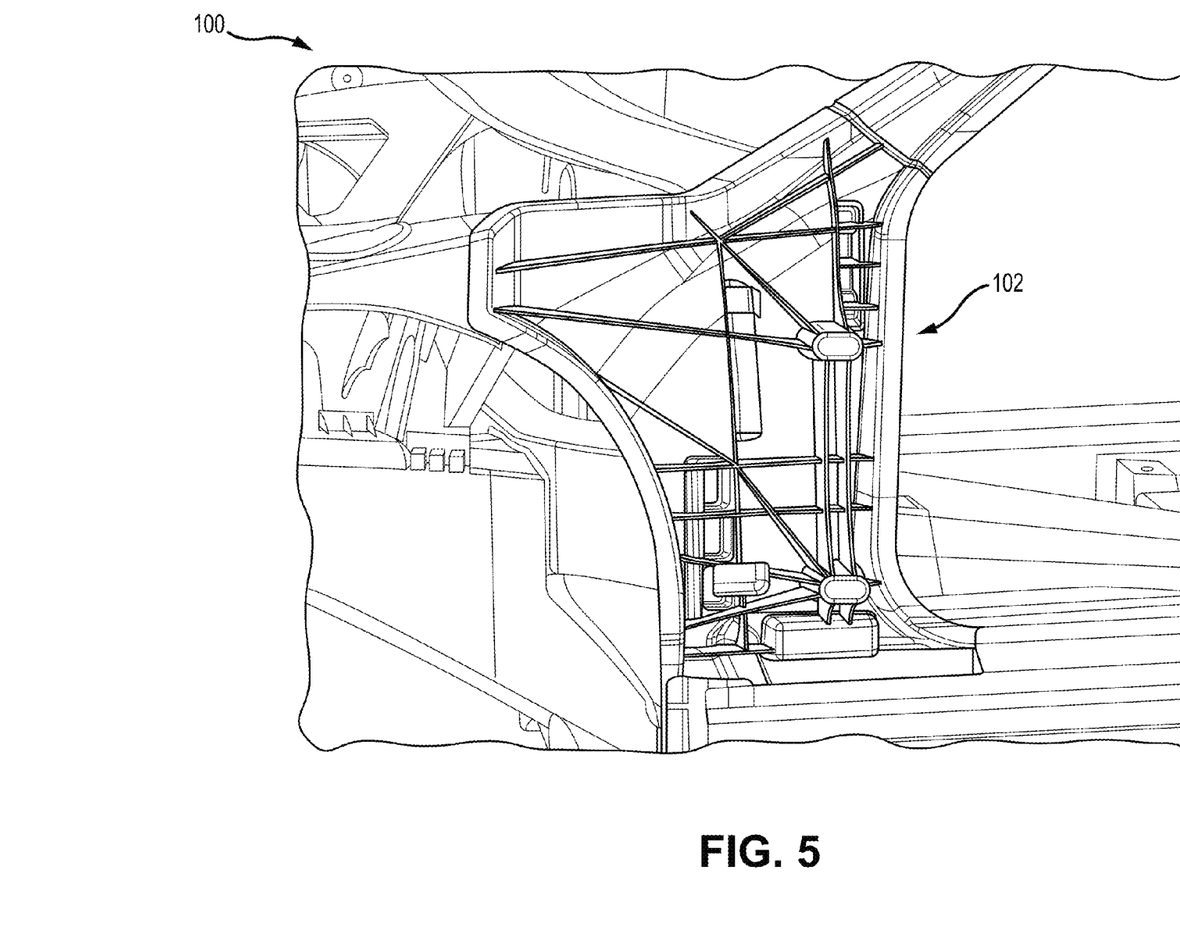
FIG. 5 illustrates a perspective view of an A-pillar structure within an electric vehicle, according to an embodiment of the present disclosure.

FIG. 5 illustrates a perspective view of the A-pillar structure 102 within the electric vehicle 100, according to an embodiment of the present disclosure.

Figure 6:
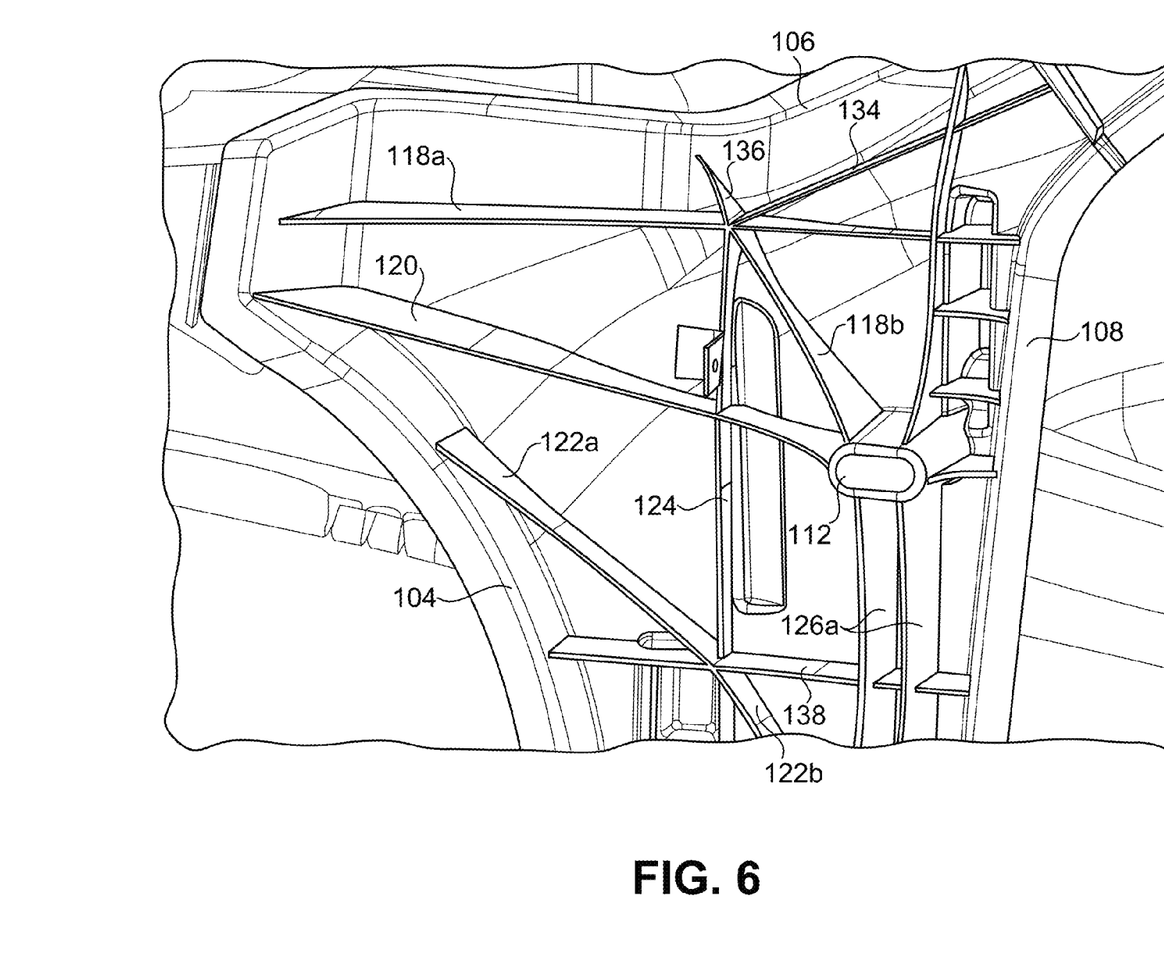
FIG. 6 illustrates a perspective view of an A-pillar structure, according to an embodiment of the present disclosure.

FIG. 6 illustrates a perspective view of the A-pillar structure 102 showing varying depths of the rib configuration and of the bosses, according to an embodiment of the present disclosure. For example, in some embodiments the middle cross rib 120 has a maximum depth at the front edge 104, and a gradually decreasing depth as the middle cross rib 120 extends toward middle node 130 where it has a minimum depth. The depth of the middle cross rib 120 increases as it extends from middle node 130 toward the upper boss 112.

Figure 7:
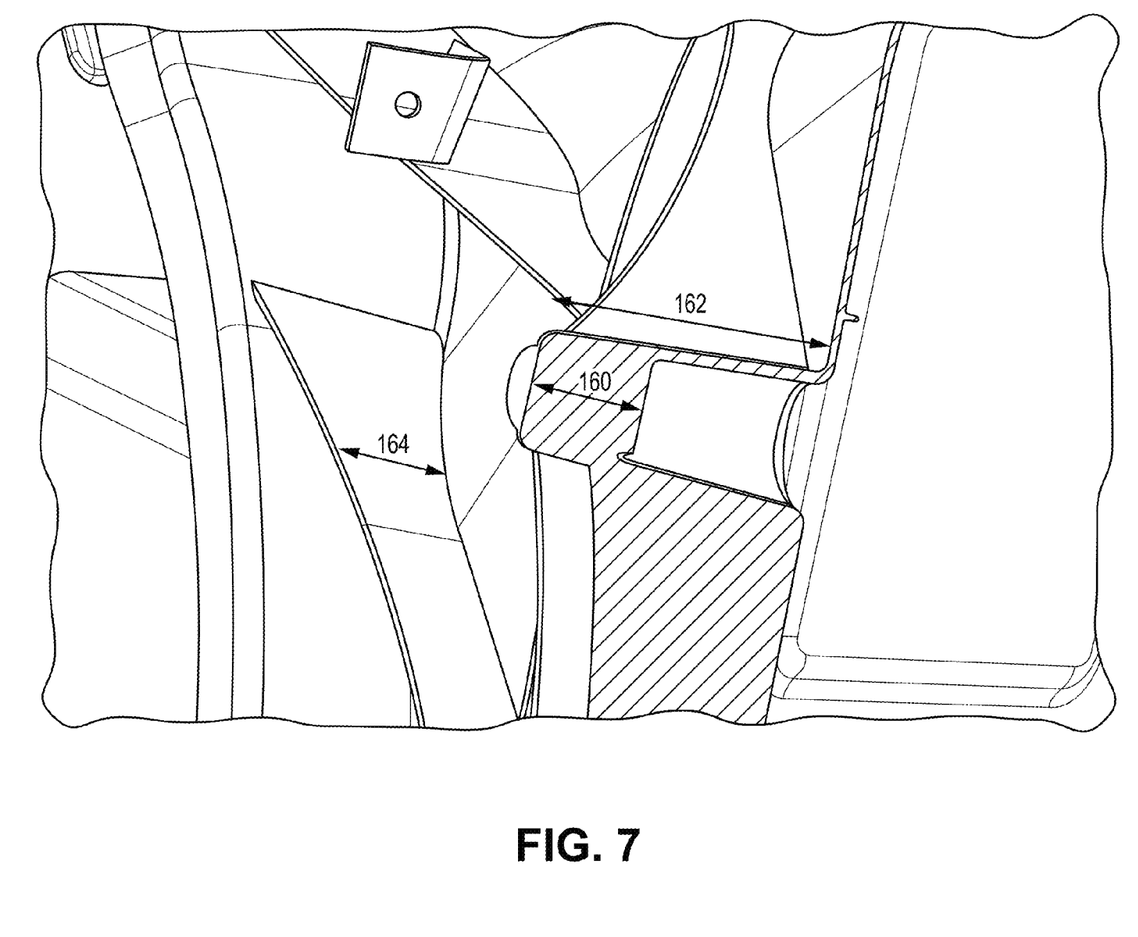
FIG. 7 illustrates a cross-sectional view of an upper boss, according to an embodiment of the present disclosure.

FIG. 7 illustrates a cross-sectional view of the upper boss 112, according to an embodiment of the present disclosure. The upper boss 112 is characterized by a boss cap depth 160 and a boss depth 162. The boss cap depth 160 is less than or equal to the boss depth 162. A rib depth 164 is also illustrated in FIG. 7. The rib depth 164 is a varying quantity that is rib dependent and location dependent. For example, the rib depth 164 varies for different ribs, and for each rib the rib depth 164 varies based on location along a specific rib.

Figure 8:
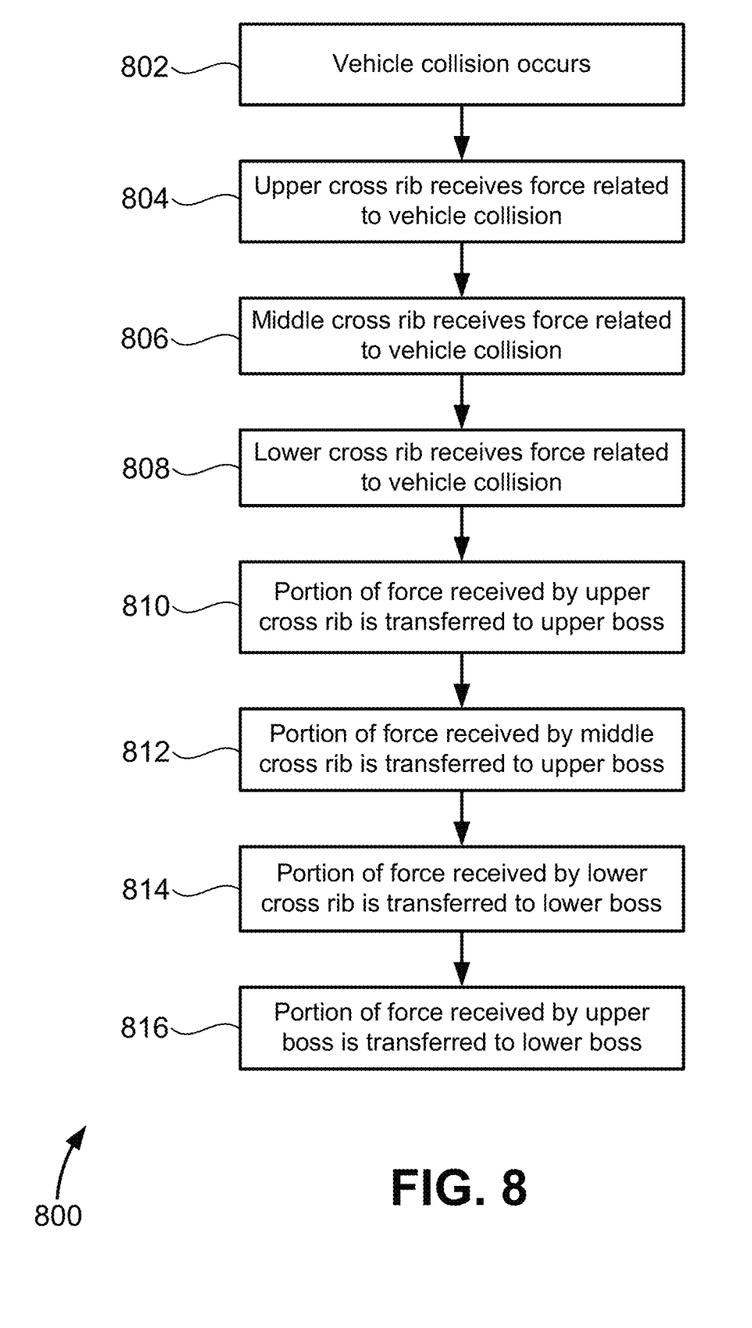
FIG. 8 illustrates a method for receiving an impact force related to a vehicle collision, according to an embodiment of the present disclosure.

FIG. 8 illustrates a method 800 for receiving an impact force related to a vehicle collision, according to an embodiment of the present disclosure. At step 802, a vehicle collision occurs. The collision may be a head-on (front), side, or angled impact, or an impact from some other direction. At step 804, the upper cross rib 118 receives a first force related to the impact force. At step 806, the middle cross rib 120 receives a second force related to the impact force. At step 808, the lower cross rib 122 receives a third force related to the impact force. At step 810, a first portion of the first force received by the upper cross rib 118 is transferred to the upper boss 112. At step 812, a second portion of the second force received by the middle cross rib 120 is transferred to the upper boss 112. At step 814, a third portion of the third force received by the lower cross rib 122 is transferred to the lower boss 114. At step 816, a fourth portion of the force received by the upper boss 112 is transferred to the lower boss 114. In some embodiments, a fifth portion of the force received by the lower boss 114 is transferred to the anchor structure 116.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

LIST OF TERMS

100—Electric Vehicle/Transportation Apparatus
102—A-Pillar Structure
104—Front Edge
106—Top Edge
108—Rear Edge
110—Bottom Edge
112—Upper Boss
114—Lower Boss
116—Anchor Structure
118—Upper Cross Rib
120—Middle Cross Rib
122—Lower Cross Rib
124—Center Rib
126—Boss Column
128—Upper Node
130—Middle Node
132—Lower Node
134—Top Rib
136—First Support Rib
138—Second Support Rib
140—Third Support Rib
142—Fourth Support Rib
144—Fifth Support Rib
146—Front Base Rib
148—Rear Base Rib
150—Cabin
152—Steering Wheel
154—Users
160—Boss Cap Depth
162—Boss Depth
164—Rib Depth
170—Surface

What is claimed is:

1. A vehicle comprising:
an A-pillar structure having a plurality of ribs protruding outward from a surface, the A-pillar structure comprising:
an upper boss and a lower boss protruding outward from the surface in the lateral direction, the upper boss being positioned vertically above the lower boss;
an upper cross rib protruding outward from the surface and extending between a front edge of the A-pillar structure and the upper boss;
a middle cross rib protruding outward from the surface and extending between the front edge and the upper boss;
a lower cross rib protruding outward from the surface and extending between the front edge and the lower boss; and
a boss column protruding outward from the surface and extending between the upper boss and the lower boss in the vertical direction;
wherein:
the upper cross rib is not directly coupled to the middle cross rib;
the middle cross rib is not directly coupled to the lower cross rib;
the lower cross rib is not directly coupled to the upper cross rib;
the upper cross rib includes two substantially planar non-parallel sections that form a first angle with respect to each other;
the middle cross rib is substantially planar; and
the lower cross rib includes two substantially planar non-parallel sections that form a second angle with respect to each other.

2. The vehicle of claim 1, wherein the A-pillar structure further comprises:
a top rib protruding outward from the surface and extending between a top edge of the A-pillar and the first angle.

3. The vehicle of claim 1, wherein the first angle and the second angle are obtuse angles, the second angle being greater than the first angle.

4. The vehicle of claim 3, wherein the A-pillar structure further comprises:
a center rib protruding outward from the surface in the lateral direction and extending between the first angle and the second angle in the vertical direction, the center rib directly coupling with each of the upper cross rib, the middle cross rib, and the lower cross rib.

5. The vehicle of claim 1, wherein the A-pillar structure further comprises:
an anchor structure protruding outward from the surface in the lateral direction, wherein the boss column extends between the lower boss and the anchor structure in the vertical direction, and wherein the anchor structure is coupled to a body structure of the vehicle.

6. The vehicle of claim 1, wherein the A-pillar structure is an aluminum casting.

7. The vehicle of claim 1, wherein the upper boss and the lower boss have a maximum depth in the lateral direction that is greater than or equal to a depth of the plurality of ribs.

8. An A-pillar structure having a plurality of ribs protruding outward from a surface, the A-pillar structure comprising:
an upper boss and a lower boss protruding outward from the surface in the lateral direction, the upper boss being positioned vertically above the lower boss;
an upper cross rib protruding outward from the surface and extending between a front edge of the A-pillar structure and the upper boss;
a middle cross rib protruding outward from the surface and extending between the front edge and the upper boss;
a lower cross rib protruding outward from the surface and extending between the front edge and the lower boss; and
a boss column protruding outward from the surface and extending between the upper boss and the lower boss in the vertical direction;
wherein:
the upper cross rib is not directly coupled to the middle cross rib;
the middle cross rib is not directly coupled to the lower cross rib;
the lower cross rib is not directly coupled to the upper cross rib;
the upper cross rib includes two substantially planar non-parallel sections that form a first angle with respect to each other;
the middle cross rib is substantially planar; and
the lower cross rib includes two substantially planar non-parallel sections that form a second angle with respect to each other.

9. The A-pillar structure of claim 8, further comprising:
a top rib protruding outward from the surface and extending between a top edge of the A-pillar and the first angle.

10. The A-pillar structure of claim 8, wherein the first angle and the second angle are obtuse angles, the second angle being greater than the first angle.

11. The A-pillar structure of claim 10, further comprising:
a center rib protruding outward from the surface in the lateral direction and extending between the first angle and the second angle in the vertical direction, the center rib directly coupling with each of the upper cross rib, the middle cross rib, and the lower cross rib.

12. The A-pillar structure of claim 8, further comprising:
an anchor structure protruding outward from the surface in the lateral direction, wherein the boss column extends between the lower boss and the anchor structure in the vertical direction, and wherein the anchor structure is coupled to a body structure of a vehicle.

13. The A-pillar structure of claim 8, wherein the A-pillar structure is an aluminum casting.

14. The A-pillar structure of claim 8, wherein the upper boss and the lower boss have a maximum depth in the lateral direction that is greater than or equal to a depth of the plurality of ribs.

15. A method for receiving an impact force related to a vehicle collision, the method comprising:
for a vehicle comprising:
an A-pillar structure having a plurality of ribs protruding outward from a surface, the A-pillar structure comprising:
an upper boss and a lower boss protruding outward from the surface in the lateral direction, the upper boss being positioned vertically above the lower boss;
an upper cross rib protruding outward from the surface and extending between a front edge of the A-pillar structure and the upper boss;
a middle cross rib protruding outward from the surface and extending between the front edge and the upper boss;

a lower cross rib protruding outward from the surface and extending between the front edge and the lower boss; and a boss column protruding outward from the surface and extending between the upper boss and the lower boss in the vertical direction;

receiving, by the upper cross rib, a first force related to the impact force;

receiving, by the middle cross rib, a second force related to the impact force;

receiving, by the lower cross rib, a third force related to the impact force;

transferring a first portion of the first force received by the upper cross rib to the upper boss;

transferring a second portion of the second force received by the middle cross rib to the upper boss; and transferring a third portion of the third force received by the lower cross rib to the lower boss;

wherein:
the upper cross rib is not directly coupled to the middle cross rib;
the middle cross rib is not directly coupled to the lower cross rib;
the lower cross rib is not directly coupled to the upper cross rib;
the upper cross rib includes two substantially planar non-parallel sections that form a first angle with respect to each other;
the middle cross rib is substantially planar; and
the lower cross rib includes two substantially planar non-parallel sections that form a second angle with respect to each other.

16. The method of claim 15, further comprising:
transferring a fourth portion of the force received by the upper boss to the lower boss via the boss column.

* * * * *